United States Patent [19]
Suozzo et al.

[11] Patent Number: 5,843,308
[45] Date of Patent: Dec. 1, 1998

[54] WASTEWATER MANAGEMENT SYSTEM

[75] Inventors: James F. Suozzo; Kathleen A.. Suozzo, both of Franklin, N.Y.

[73] Assignee: DSS Environmental, Inc., Oneonta, N.Y.

[21] Appl. No.: 744,024

[22] Filed: Nov. 5, 1996

[51] Int. Cl.$^6$ .................................................. C02F 9/00
[52] U.S. Cl. ........................ 210/195.1; 210/201; 210/203; 210/284
[58] Field of Search ..................................... 210/792, 807, 210/189, 203, 266, 268, 269, 284, 201, 202, 195.1, 196

[56] References Cited

U.S. PATENT DOCUMENTS

| | | | |
|---|---|---|---|
| 4,048,068 | 9/1977 | Hirs | 210/284 |
| 4,246,102 | 1/1981 | Hjelmner et al. | 210/793 |
| 5,277,829 | 1/1994 | Ward | 210/807 |
| 5,454,959 | 10/1995 | Stevens | 210/269 |
| 5,462,654 | 10/1995 | Hering | 210/189 |

*Primary Examiner*—Ivars Cintins
*Attorney, Agent, or Firm*—Salzman & Levy

[57] ABSTRACT

The present invention is a dual-stage, gravity continuously-backwashed filtering system for filtering contaminants from wastewater. This filtering system has a first sand-filter unit that is loaded with wastewater influent. The filtering sytem has injection points for coagulation chemicals and disinfection chemicals. The first sand-filter unit is connected in series to a second sand-filter unit of similar design. The first sand-filter unit is made up of large-grained sand, the second sand-filter unit fine-grained sand. The second sand-filter unit receives its influent from the effluent weir of the first sand-filter unit. The reject water from the second filter unit is re-introduced into the influent that is fed to the first filter unit. The reject matter from the first filter unit is passed to waste.

18 Claims, 7 Drawing Sheets

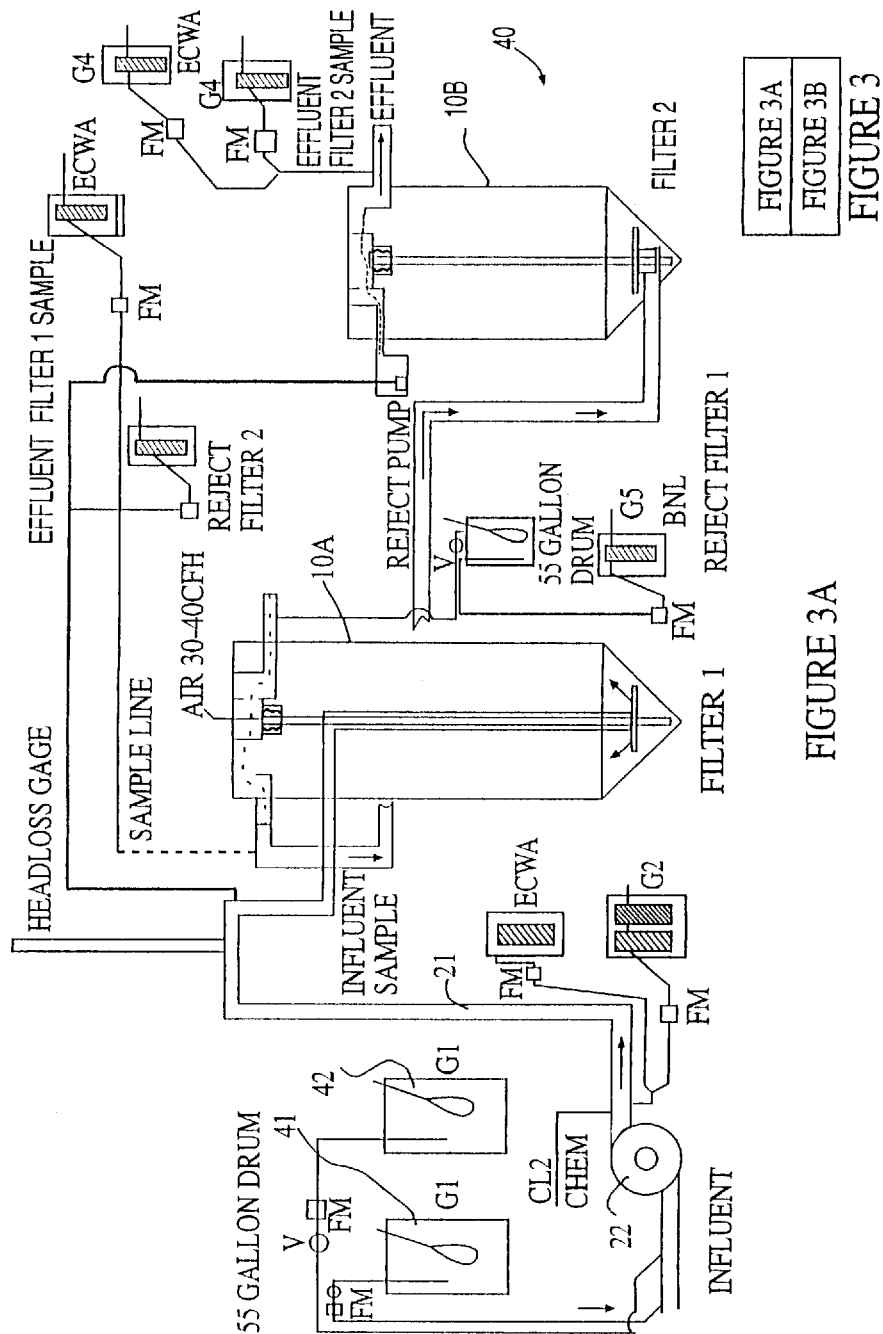

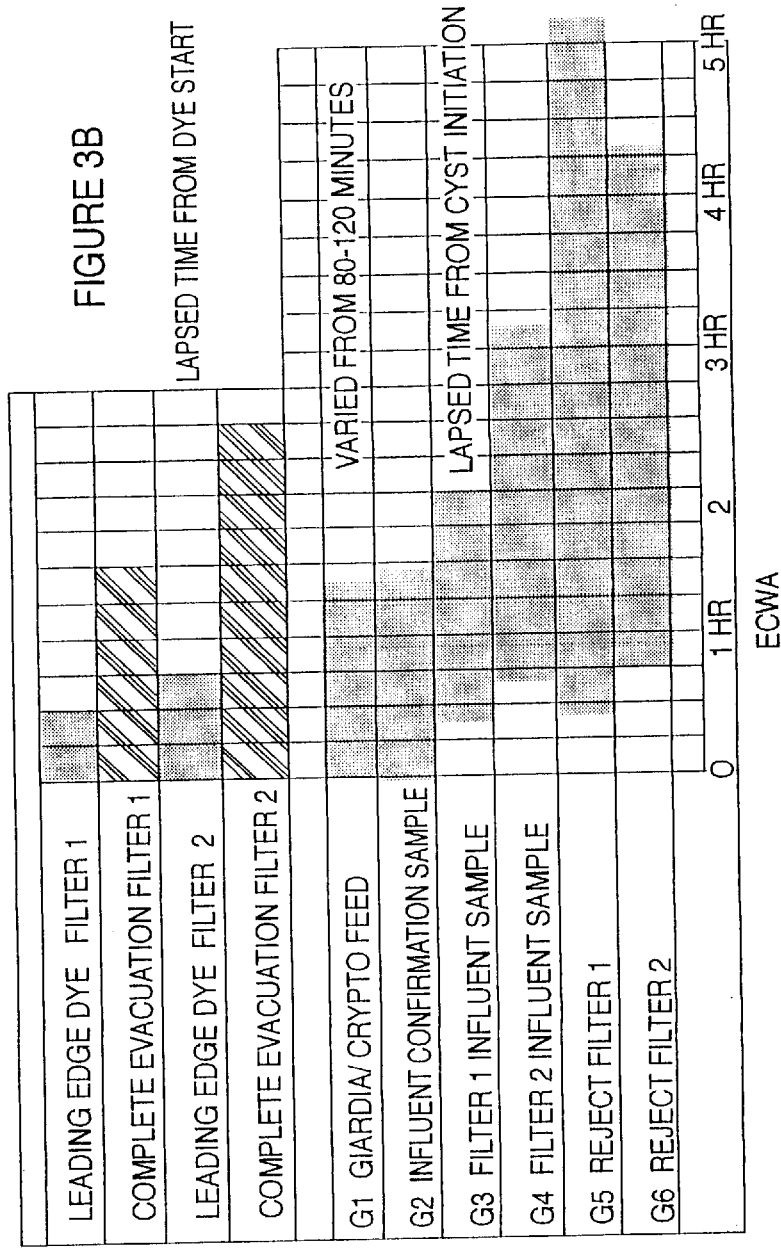

Chart GC-2

Stamford Deomstration Project

Mass Balance of Selected Spike Challenge Events

| Spike | Protozoan | Spike Concentration A | Filter #1 Backwash B | Filter #2 Effluent C | Filter #1 Effluent D | Final Effluent E |
|---|---|---|---|---|---|---|
| 30-Oct | G | 1.00e+08 | 4.50e+04 | 308 | 0 | 0 |
|  | C | 1.00e+08 | 4.83e+05 | 1220 | 111 | 0 |
| 6-Nov | G | 1.00e+08 | 1.41e+05 | 2 | 0 | 0 |
|  | C | 1.00e+08 | 6.90e+05 | 22 | 49 | 0 |
| 27-Nov | G | 1.00e+08 | 2.84e+02 | 0 | 0 | 0 |
|  | C | 1.00e+08 | 8.53e+02 | 0 | 0 | 0 |
| 11-Dec | G | 2.00e+08 | 1.11e+04 | 0 | 0 | 0 |
|  | C | 2.00e+08 | 4.84e+05 | 2 | 3 | 0 |

G - Giardia muris cysts
C - Cryptosporidium parvum oocysts

See appendix GC-2 for raw data

Figure 5

WASTEWATER MANAGEMENT SYSTEM

FIELD OF THE INVENTION

The present invention pertains to wastewater management systems and, more particularly, to a system featuring a double filtering of wastewater in order to eliminate or substantially reduce phosphorus, pathogens and protozoans.

BACKGROUND OF THE INVENTION

The use of sand-filtering systems to treat wastewater has become a preferred means of eliminating harmful materials from contaminated effluents. The present invention employs a double sand-filtering system in order to substantially reduce phosphorus, pathogens and protozoans from wastewater effluents. To the best of the inventor's knowledge, this is the first time that an upflow, continuously-cleaning, continuously-backwashed filtration system uses double sand-filters in series.

One of the objectives of this invention is to provide a wastewater filtering system that is simple, yet is simultaneously extremely effective. Most municipalities and state governments lack funding for such projects. It is essential, therefore, that the filtration system developed for use with local governments be simple and cost-effective.

The dual sand-filtration system affords an outstanding level of removal of phosphorus, total suspended solids, turbidity and biochemical oxygen demand (BOD5). The preferred filtering units of this invention comprise Parkson upflow Dynasand filter units. The filtration system of the invention provides pathogen removal on levels that exceed Federal standards. In the wastewater treatment program of the invention, the dual-stage, in-series, upflow filtration system successfully filters from the effluent high concentrations of Giardia and Cryptosporidium.

The filters of the inventive system feature a continuous backwash. Influent is introduced into a sand bed through a series of feed radials, which are open at the bottom. As the influent flows upwardly through the moving sand bed, the solids are removed. The filtrate exits at the top of the filter. Simultaneously, the sand bed, along with the accumulated solids, is drawn downwardly into an airlift pipe, which is located in the center of the filter. A small volume of compressed air is introduced at the bottom of the airlift. The air rises, drawing the sand into the airlift and scouring it at a loading rate of approximately 10–150 SCFH as it rises therein.

Upon reaching the top of the airlift, the dirty slurry spills over into a central rejection compartment. The sand is returned to the sand bed through a washer/separator. As the sand falls through the washer (which consists of several concentric stages), a small amount of filtered water passes upwardly, washing away the dirt and allowing the heavier, coarser sand to fall through to the bed. By setting a filtrate weir at a higher level than a weir for rejected material, a steady stream of wash-water is assured. Loading rates of approximately 1%–5% of the influent flow provide optimal sand washing. The continuous rejected material exits near the top of the filter. In this way, the sand bed is continuously cleaned, while both a continuous filtrate and rejected material are produced.

The filtration system of the invention comprises a first sand-filter unit that is loaded with influent in the aforementioned manner. The first sand-filter unit is connected in series to a second sand-filter unit of similar design. The first sand-filter unit comprises large-grained sand in a range of approximately 1.0–2.0 mm in size. The second sand-filter unit receives its influent from the effluent weir of the first sand-filter unit. The second sand-filter unit comprises a fine-grained sand in a range of approximately 0.35–1.2 mm in size. The reject water from the second filter is re-introduced into the influent that is fed to the first filter. The reject matter from the first filter is passed to waste.

It is an object of the invention to provide an improved filtering system for treating wastewater.

It is another object of this invention to provide a wastewater treatment system that will effectively remove pathogens, phosphorus and protozoa from waste.

It is yet another object of the invention to provide a wastewater treatment system featuring dual-stage, upflow, sand-bed filtering units.

SUMMARY OF THE INVENTION

In accordance with the present invention, there is provided a two-stage, gravity continuously-backwashed, filtering system that is designed to eliminate phosphorus, pathogens and protozoa from wastewater. The filtration system of the invention comprises a first sand-filter unit that is loaded with the wastewater influent that is introduced into a sand bed through a series of feed radials, which are open at the bottom. As the influent flows upwardly through the moving sand bed, the solids are removed. The filtrate exits at the top of the filter. The first sand-filter unit is connected in series to a second sand-filter unit of similar design. The first sand-filter unit comprises large-grained sand in a range of approximately 1.0–2.0 mm in size. The second sand-filter unit receives its influent from the effluent weir of the first sand-filter unit. The second sand-filter unit comprises a fine-grained sand in a range of approximately 0.35–1.2 mm in size. The reject water from the second filter is re-introduced into the influent that is fed to the first filter. The reject matter from the first filter is passed to waste. The processed effluent from the first sand-filter is fed to the bottom of the second sand-filter, which likewise processes the wastewater.

BRIEF DESCRIPTION OF THE DRAWINGS

A complete understanding of the present invention may be obtained by reference to the accompanying drawings, when considered in conjunction with the subsequent, detailed description, in which:

FIG. 3 is an interconnection diagram of FIGS. 3A and 3B.

FIG. 3A shows a schematic, plan view of the inventive filtration system as illustrated in FIG. 2, modified for testing and for the removal of Giardia and Cryptosporidium from the wastewater system shown in FIG. 1a;

FIG. 3B is a timing diagram of FIG. 3A.

FIG. 5 depicts a graph of the concentration of the protozoan materials in the effluent of the filtration system, after the spike injections thereof as illustrated in FIG. 4.

DESCRIPTION OF THE PREFERRED EMBODIMENT

Generally speaking, the invention features a dual-stage filtering system for filtering contaminants from wastewater. The filtering system comprises a first sand-filter unit that is loaded with wastewater influent. The first sand-filter unit is connected in series to a second sand-filter unit of similar design. The first sand-filter unit comprises large-grained sand, and the second sand-filter unit comprises fine-grained sand. The second sand-filter unit receives its influent from the effluent weir of the first sand-filter unit. The reject water from the second filter unit is re-introduced into the influent that is fed to the first filter unit. The reject matter from the first filter unit is passed to waste.

The filters of this inventive system are preferably Parkson Dynasand-filters, but are not limited thereto. The inventive system was tested for a twelve-week period under normal operating conditions. The side-by-side test consisted of thorough monitoring of typical wastewater parameters, in addition to spike testing and monitoring of both Giardia and Cryptosporidium (oo)cysts.

Figure 1:
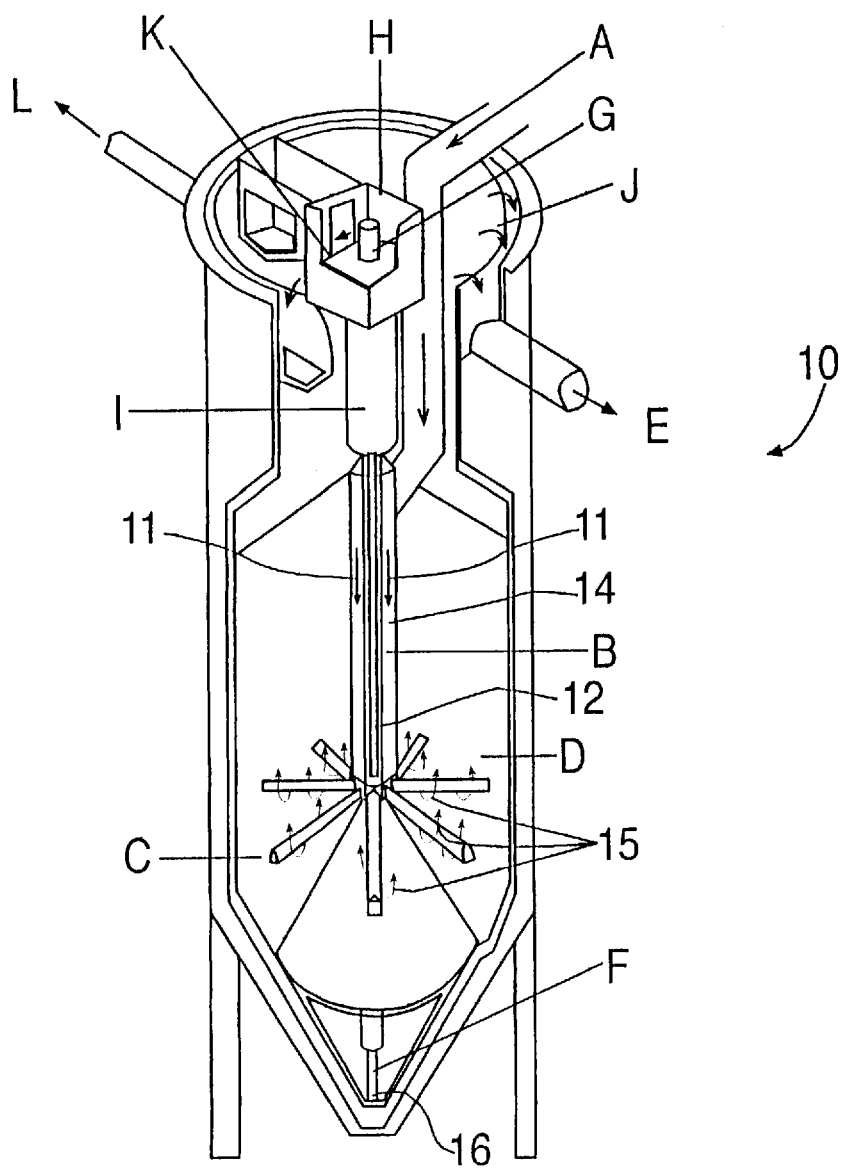
FIG. 1 illustrates a schematic, perspective, cutaway view of a typical, sand-bed filter unit of the filtration system of this invention.

Now referring to FIG. 1, a typical sand-filter 10 used in the filtration system of this invention is shown. The sand-filter 10 is a continuous-backwash filter that receives wastewater introduced at the top A thereof. The wastewater flows downwardly (arrows 11) through an opening B between a wall 12 of a feed pipe and an airlift housing wall 14. The wastewater is introduced into the sand bed D through a series of feed radials C, which are open at the bottom thereof. As the influent flows upwardly through the moving sand bed D (arrows 15), the solids are removed. The filtrate exits at the top of the sand-filter 10 at effluent exit E.

The sand bed D, along with the accumulated solids, is simultaneously drawn downwardly into the airlift pipe 16 at point F, located in the center of the sand filter 10. A small volume of compressed air is introduced at the bottom F of the airlift pipe 16. The air then rises and draws the sand into the airlift pipe 16. Next, the sand is scoured at a loading rate of 10–150 SCFH, as it rises into the airlift pipe 16.

Upon reaching the top G of the airlift pipe 16, the dirty slurry spills over into a central, rectangularly-shaped, reject compartment H. The sand is returned to the sand bed D through a washer/separator I. As the sand falls through the washer, which consists of several concentric stages (not shown), a small amount of filtered water passes upwardly, washing away the dirt and allowing the heavier, coarser sand to fall through to the sand bed D. A filtrate weir J is positioned at a higher level than a reject weir K, ensuring that a steady stream of wash-water is obtained. Loading rates of 1%–5% of the influent flow provide optimal sand washing. The continuous rejected material exits near the top of the filter at point L. In this way, the sand bed 10 is continuously cleaned, while both a continuous filtrate and rejected matter are produced.

Figure 2:
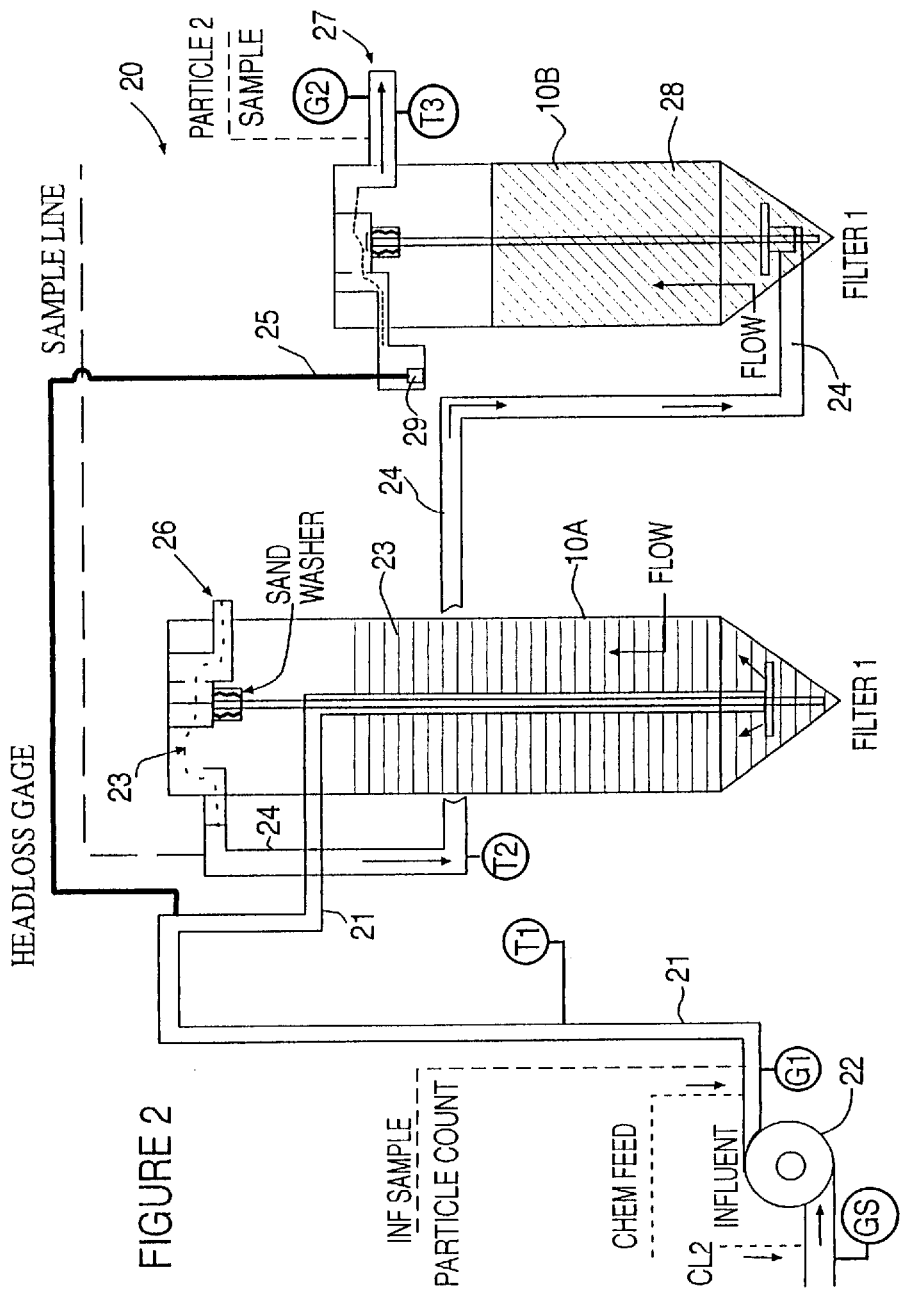
FIG. 2 depicts a schematic, plan view of the dual-stage, sand-bed filtration system of the invention.

Referring to FIG. 2, the filtration system 20 of this invention is depicted. The filtration system 20 comprises a first sand-filter unit boa that is loaded with influent through conduit 21 by pump 22. The first sand-filter unit 10a is connected in series to a second sand-filter unit 10b of similar design. The first sand-filter unit 10a comprises a large-grained sand bed 23; this sand is in a range of approximately 1.0–2.0 mm in size. The second sand-filter unit 10b receives its influent from the effluent weir 24 of sand-filter unit 10a via conduit 24. The second sand-filter unit 10b comprises a sand bed 28; this sand is a fine-grained sand or garnet in a range of approximately 0.35–1.2 mm in size. The reject water from the second filter unit 10b is re-introduced into the influent that is fed to the first filter unit 10a, via conduit 25, and reject pump 29. The reject matter from the first filter unit 10a is passed to waste at point 26. The processed, wastewater effluent from the second filter unit 10b exits at point 27.

The Dynasand-filter units 10a and 10b are manufactured by the Parkson Corporation of Fort Lauderdale, Fla. The sand used in the first filtering unit 10a is preferably silica sand (1.4 mm at an approximate 8 ft. depth), and, in the second filtering unit 10b, silica or garnet sand (1.0 mm at an approximate 5 ft. depth). The filter unit 10a is approximately 12 sq. ft., and the filter unit 10b is also approximately 12 sq. ft. The filtering unit 10b differs from filtering unit 10a in that the influent enters filtering unit 10b from the bottom, as illustrated in FIGS. 2 and 3.

The above filtration system 20 of FIG. 2 was tested for twelve weeks, shown in FIG. 1, in conjunction with a typical treatment plant 30 at the wastewater facilities in Stamford, N.Y., under the auspices of the New York City Department of Environmental Protection (NYCDEP). Designing the system 20 to recycle the reject water from the second filter unit 10b reduced the backwash flow from less than 5% to less than 3% in the Stamford facility. This was possible because the turbidities were 1.5 NTU or less.

In addition to outstanding levels of removal of phosphorus, total suspended solids, turbidity and biochemical oxygen demand (BOD5), the filtration system 20 of this invention removed pathogens and protozoa to levels exceeding Federal standards.

In the Stamford test, various coagulation polymers were tested, along with improving reaction times. Ferrous sulfate addition to the secondary Stamford wastewater effluent was practiced during the early weeks. There was some initial concern about a possible chlorine disruption of the bond between the metal ion and the associate phosphorus. It was not known whether the chlorine would react with the metal ions in such a way as to reduce total phosphorus removal. These fears were not realized, however.

Physical parameters and time-travel protocol through the system were critically assessed to better monitor the removal of mass dosages [$1 \times 10^8$ or 100,000,000 cysts and (oo)cysts] of Giardia and Cryptosporidium, which were introduced into the modified filtration system 40 illustrated in FIG. 3. A companion data set for Giardia and Cryptosporidium was developed to evaluate normal dose ranges experienced in the typical plant 30 effluent, illustrated in FIG. 1a. By examining both the high and normal concentrations of Giardia and Cryptosporidium, all conditions could be bracketed to determine the effective removal rate of both pathogens through the filtering system.

At the beginning of the Stamford project, both filter units were dye-tested to verify travel times. The travel times were established to confirm duration of contact with chlorine and for subsequent Giardia/Cryptosporidium spike challenges. The filter travel times are listed below:

| Filter Unit 10a | |
|---|---|
| Leading Edge | Complete Evacuation |
| 29 min. | 1 hr. 28 min. |
| Filter Unit 10b | |
| Leading Edge | Complete Evacuation |
| 45 min. | 2 hrs. 30 min |

The above numbers determined the Giardia/Cryptosporidium protocol. The leading-edge numbers represent the minimum chlorination contact time, with final chlorine residuals taken at the end of filter unit 10b. The total reject volume from the filter unit 10a was approximately 0.9–1.7 GPM. Total influent flows for the same time period were between 36–48 GPM. The estimate of total backwash percentage for the filter unit is 3%.

Figure 1A:
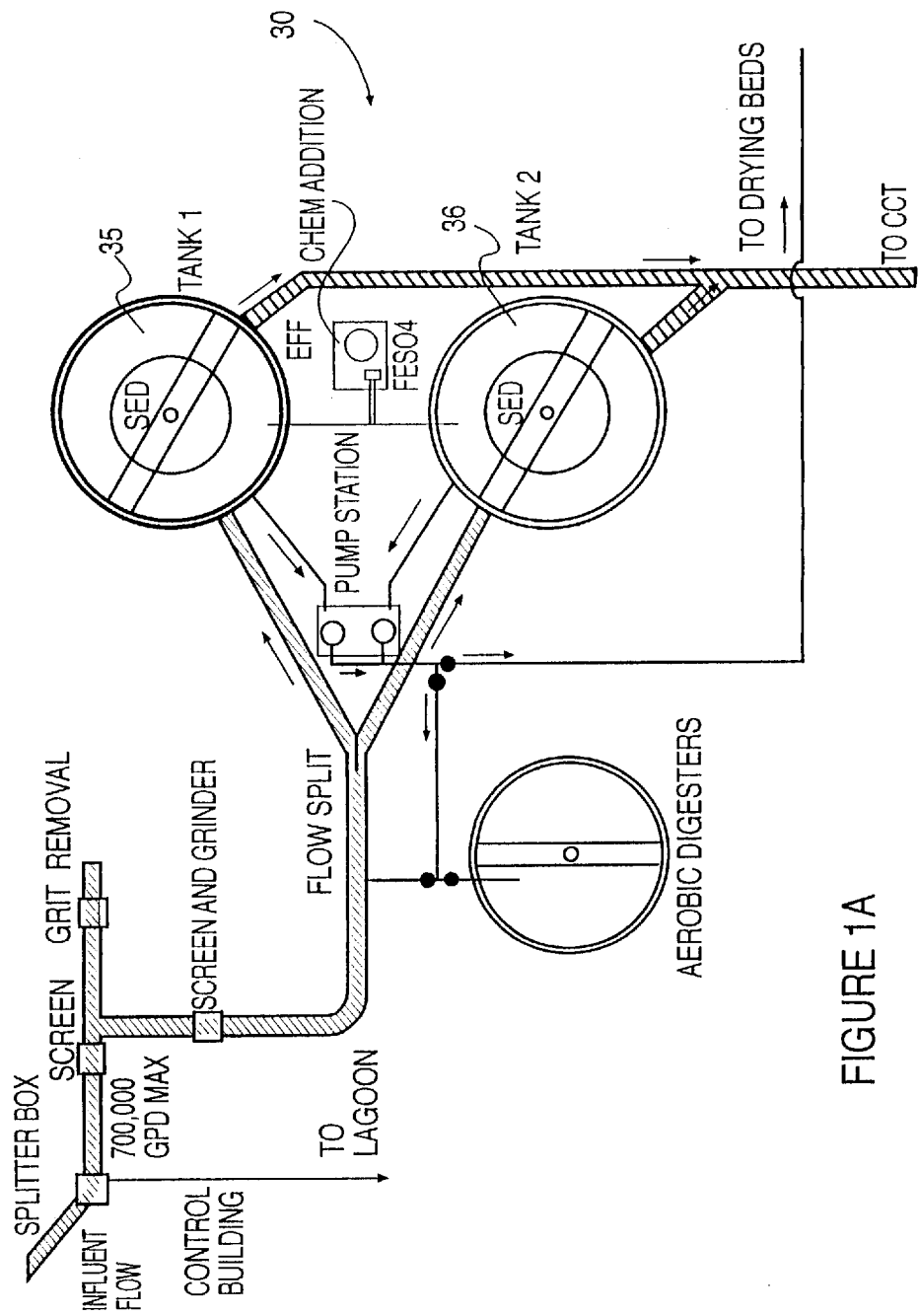
FIG. 1a shows a schematic view of a typical, town wastewater facility used in conjunction with the filtration system of this invention.

The Village of Stamford Wastewater Treatment Plant, illustrated in FIG. 1a, treats about 200,000–500,000 GPD. The influent comes in by gravity and goes into a splitter box. Normal flows (up to 700,000 GPD) proceed through a hand-cleaned screen, grit removal, another screen, and flow measurement. There is no primary clarifier; flow from the partial flume goes into an outside channel and flow splitter. The flow is divided equally between two package-extended aeration units that include an aeration tank and secondary clarifier. Aerobic digestion is performed in a totally separate tank and is not part of the package system. Effluent from the two units flows to a remote chlorine contact tank and then out to the West Branch of the Delaware River.

Chlorine was injected by the use of a small diaphragm pump prior to the filter influent pump. Sufficient chlorine was added to maintain a residual of 0.5 mg/liter in filter unit 10a and a 0.2 mg/liter residual in filter unit 10b, with influent chlorine concentrations between 1.5 mg/l and 2.0 mg/l. Chlorine residuals were taken manually twice a day. The travel time through filter unit 10a was about 45 minutes, and about 1 hour and 20 minutes through filter unit 10b. Both time intervals were above what is normally required for chlorination contact time (CCT). A normal chlorine contact tank requires a 30-minute average and a 15-minute peak for chlorine contact time, with a concentration in the 1.0–1.8 mg/liter range.

The benefits of disinfection through the filtering process are twofold. Effluent disinfection is a requisite process at most wastewater treatment plants; secondly, the filtering unit is a physical process subject to biological fouling. The inclusion of a mild oxidant kept the filtering system working at its full potential.

Effective chlorination is enhanced by the removal of organics and inorganics within the first 18" or so of filtering media. In effect, the system becomes a filtering and a disinfection mechanism, all within the same vessel. The chlorine is that much more effective owing to the low turbidity (less than 1 NTU) of the effluent, even in cold water (less than 5° C.).

Noteworthy is the fact that during the seven months of the Stamford Demonstration Project, an air bump to the filtering system was not required. The small chlorine residual kept the filtering system working without any biological accumulation.

The Stamford Wastewater Treatment Plant has traditionally produced high-quality effluent. The following effluent results are typical:

BOD5 5.0–12.0 mg/liter

TSS 5.0–15.0 mg/liter

NH3-N<3.0 mg/liter p<2.0 mg/liter.

In 1994, the NYCDEP funded a pilot project at the Stamford Wastewater Treatment Plant for effluent phosphorus reduction with the addition of the phosphorus-sequestering chemical, ferrous sulfate. The chemical was added to each of the aeration basins 35 and 36, respectively. This succeeded in reducing effluent total phosphorus to less than 0.5 ppm.

The polymer used in the filtering units of this invention, was poly-aluminum-silicate-sulfate (PASS), an adaptable cold-water coagulant. Coagulation is the key to optimizing the particle-count removal, in the absence of a coagulation tank.

PASS has a unique property, as flocculation occurs immediately, with no residence time required. The hydrolysis is so quick that the chemical cannot be diluted with water, as flocculation will develop in the feed drum. The other benefits are both the amount and the cost of PASS. The PASS was being added at about 3 gallons per day.

During the early testing period, the particle counts were cut in half with no filter blinding nor polymer build-up. Afterward, there was no biomass build-up in the filter units that would be indicative of polymer problems. In fact, the system met USEPA drinking-water quality turbidity levels.

The typical average filter influent and effluent levels for the filtering system 20 during the test program are shown below in Table I.

TABLE I

| Parameter | Filter Influent | Filter Effluent |
|---|---|---|
| Turbidity | 3.5 NTU | <0.18 NTU |
| 2–4 Micron Particle Counts | 2700/100 ml | <10 counts/100 ml |
| Phosphorus-total | 0.9 mg/liter | <0.014 mg/liter |
| Suspended Solids-total | 9.0 mg/liter | <0.12 mg/liter |
| Fecal Coliform | TNTC | <1 count/100 ml |
| BOD5 | 5.0 mg/liter | 0.20 mg/liter |

Figure 4:
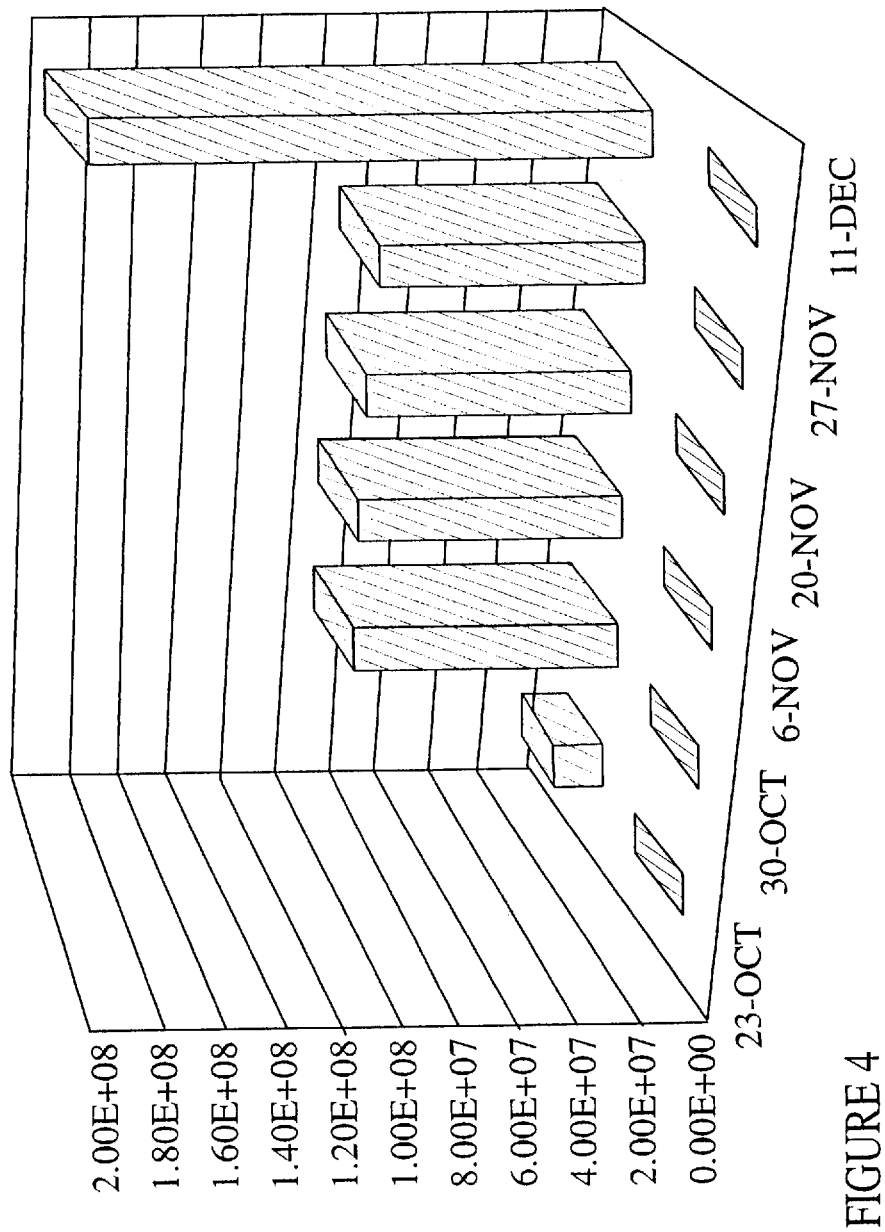
FIG. 4 illustrates a graph of the spike injection of protozoan materials into the filtration system of this invention.

Referring to FIG. 4, the modified in-series upflow filtration system 40 was challenged with spike concentrations of Cryptosporidium (oo) cysts and Giardia cysts on six occasions. The protozoa were contained in 55-gallon drums 41 and 42 respectively. The protozoa were pumped from the respective drums 41 and 42 into the influent feed line 21. The highest concentration of Cryptosporidium and Giardia available (e.g., $1.00 \times 10^8$, shown in FIG. 4) were used for spiking. Even at these concentrations, the in-series upflow filtration system 40 maintained full removal of detectable Cryptosporidium (oo) cysts and Giardia cysts.

The graph of FIG. 4 shows the spike concentration introduced into the filter units over 100 minutes with the effluent results from filter unit 10a and filter unit 10b (final effluent). The final effluent contained no (oo)cysts of either Giardia or Cryptosporidium. However, (oo)cysts were recovered from the effluent from filter unit 10a. This finding indicates that the second stage of the filtration system 20 provides complete removal of all injected protozoan (oo) cysts. All analyses reported in the chart had a detection limit of 0.7 (oo)cysts/100 ml or less.

There were 6 sites sampled during the spike-challenge portion of the project, as shown in FIG. 3. The important monitoring stations were:

G1 - Giardia and Cryptosporidium feed

G2 - Influent Confirmation Sample

G3 - Effluent of Filter Unit 10a

G4 - Effluent of Filter Unit 10b

G5 - Reject of Filter Unit 10a

G6 - Reject of Filter Unit 10b.

Based on the hydraulics of the system and the time sequencing, each station presented a different challenge. Stations were established, so that representative samples could be taken over both short and long time periods without blinding of the collection filter, interruption of flow, or undue sediment.

Station G1 was set up with two 55-gallon drums 41 and 42, respectively, for mixing and batch-processing. The (oo) cysts for both Giardia and Cryptosporidium were fed over an extended period of 60 to 90 minutes, which is a more representative way of introducing the material into the system.

A metered amount of water was calibrated at least 6 times to verify the desired time of emptying the 55 gallons, since the induction point for both Giardia and Cryptosporidium is on the suction side of the pump 22. Once the rate was established, the suction hose was moved immediately into the 55-gallon drum, and injection of the Giardia/Cryptosporidium was begun. During the feed time period, the drum was mixed by hand every 5 to 7 minutes to make sure a homogeneous mixture was being introduced into the system.

The G2 sampling point was within a minute's travel time of G1. A ¾-inch PVC tap off the pressure side of the pump, on the corner of an elbow, would provide a representative sample, based on turbulence and direction of flow. The ¾-inch line ran inside the building to a central sink where a three-way splitter was the termination port. The special splitter was chosen, as all legs were equally distant from the flow center and would distribute flow equally to three separate filters for sampling. The G2 sampling period was initiated 2 minutes before (oo)cyst introduction, and continued for 5 minutes after the (oo)cyst feed was completed.

Station G3 sampled the effluent of filter unit 10a. This point was located just after the effluent weir, and before the drop to filter unit 10b. The line was a ¾-inch plastic line that led directly to the indoor sample sink and a close nipple that would attach directly to the filtration apparatus. Sampling at G3 was started prior to the leading-edge dye-study time, and continued until 20 minutes past the complete evacuation time.

Station G4 was the sampling point for the effluent of filter unit 10b, or the final effluent, and was connected in a similar fashion as G3. The connection was directly into the filter apparatus. G4 had two samples taken per event. G4 time, again, was based on the leading-edge time of travel for filter unit 10b, and was extended past complete evacuation.

Station G5 was the sampling point for the reject of filter unit 10a. This was a critical point for the protocol, because if a mass balance were to be conducted, this was where the Giardia and Cryptosporidium were expected to be. This point had to be sampled longer than any other station, because the reject from filter unit 10b was pumped back through filter unit 10a. As this time interval had to be over 4 hours and 30 minutes, the flow meter used on the filtration apparatus could not reduce the flow accurately enough to supply the filter. If there were too much flow, the filter would blind too early; if there were too little, a representative sample would not be taken. The decision was made to fill a 55-gallon drum with a metered amount of effluent that would just fill the drum in the allotted time. After the drum was full, the effluent could be mixed and sent through the filtration apparatus, so as to get a representative sample.

Station G6 was the final reject sample from filter unit 10b; it did not have the solids content of the filter unit 10a reject. It was also on a pumped line, so that flow regulation was possible. The time interval for sampling was less than half of G5, so the filtration apparatus was set up right at the filter unit 10b location. The approximate sampling time of G5 was 3 hours and 40 minutes.

Referring to FIG. 5, the (oo)cyst concentrations through the various outlets of the filtration system is shown. The injected spike concentrations are compared to the effluent concentrations from filter unit 10a and filter unit 10b, in addition to the backwashed reject water from both filter units. This chart shows that high concentrations of injected (oo)cysts are removed by the filtration system. The large recoveries in filter unit 10a backwash indicate that this is the primary removal route of contaminants, with the second filter unit 10b polishing the final effluent. This data is further depicted in FIG. 4, showing the percentage of removals of (oo)cysts from the various filter system stream flows after the spike challenge events. Filter unit 10a backwash accounts for between 99.3% and 100% removal of recoverable (oo)cysts. The balance are removed through filter unit 10b. No (oo)cysts were released in the final effluent.

FIG. 3 depicts all of the monitoring stations in the top portion of the FIGURE. The dye-study results, along with the time-frame protocol for the spike challenges, are illustrated in the graph at the bottom of the FIGURE.

The pathogen mass balance through the filtering system indicates that the first-stage backwash unit 10a removed the majority of the injected (oo)cysts. The second-stage backwash unit 10b removed the remaining pathogens, resulting in 100% removal of all injected (oo)cysts. The sampling intervals during the challenge events ensures that any (oo)cyst accumulation in and subsequent sloughing from the filter media are caught.

Routine samples were collected for eleven weeks from both the tertiary effluent and the typically secondarily-treated effluent from Stamford's plant 30. No Cryptosporidium (oo)cysts were detected in any of the samples collected. Although Giardia cysts were detected in half of the plant 30 samples collected, no cysts were detected after this effluent was successfully treated by the inventive system 20. The series of Giardia/Cryptosporidium spikes were performed to simulate an outbreak in the general population. The results indicated an average of 3 log, or, a 99.9% removal efficiency.

Phosphorus removal was one of the main goals of the test. There had been some doubt in the environmental and technical communities as to whether any system could achieve 0.2 mg/liter total effluent. The inventive system 20 produced effluent phosphorus results at about 0.1 mg/liter.

The dual-stage, continuously-cleaning, upflow filtration system 20 of this invention can be used over a wide variety of flow ranges and wastewater types, without sophisticated controls. The system is easy to operate, maintain and monitor. The system is extremely reliable and user-friendly; it consistently produces exceptional effluent quality.

The dual-stage system 20 continuously cleaned contaminants from the wastewater to levels where the effluent approached drinking-water quality. This was accomplished, while also maintaining compliance with the NYCDEP Watershed Rules and Regulations.

The dual-stage system 20 continuously cleaned pathogens from the wastewater to levels exceeding Federal standards.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A two-stage, continuously-filtered system for eliminating phosphorus, pathogens and protozoa from water, comprising:

a first sand-filter unit that is upflow loaded with water influent, said first sand-filter unit having an effluent weir and a reject weir, with a level of said reject weir being disposed below said effluent weir, whereby said first sand-filter unit evacuates all of its reject water, said first sand-filter unit comprising a sand bed containing relatively larger-grained sand;

a first feeding means for upflow feeding said first sand-filter unit with water influent containing contaminants;

a second sand-filter unit connected in series to said first sand-filter unit, said second sand-filter unit being smaller than said first sand-filter unit and having means for receiving its influent from the effluent weir of said first sand-filter unit, said second sand-filter unit having an effluent weir and a reject weir, said second sand-filter unit comprising a sand bed containing relatively finer-grained sand than said first sand-filter unit;

a second feeding means for upflow feeding said second sand-filter unit with influent from said effluent of said first sand-filter unit; and means for re-introducing reject water from the second sand filter unit into the influent that is fed to said first sand-filter unit.

2. The two-stage, continuously-filtered system in accordance with claim 1, further comprising means for passing reject matter from the first filter unit to waste.

3. The two-stage, continuously-filtered system in accordance with claim 1, wherein said sand bed of said first sand-filter unit comprises silica material.

4. The two-stage, continuously-filtered system in accordance with claim 1, wherein said sand bed of said second sand-filter unit comprises garnet material.

5. The two-stage, continuously-filtered system in accordance with claim 1, wherein said sand bed of said second sand-filter unit comprises silica material.

6. The two-stage, continuously-filtered system in accordance with claim 1, further comprising:

means for feeding said first and second sand-filter units with a coagulant.

7. The two-stage, continuously-filtered system in accordance with claim 1, further comprising;

means for feeding said first sand-filter unit with chlorine as a disinfecting agent.

8. A two-stage continuously filtered system for processing water in order to eliminate contaminants therefrom, comprising:

a first sand-filter unit that is upflow loaded with water influent containing contaminants, said first sand-filter unit having an effluent weir and a reject weir, with a level of said reject weir being disposed below said effluent weir, said first sand-filter unit comprising a sand bed containing large-grained sand;

a first feeding means for upflow feeding said first sand-filter unit with water influent containing contaminants;

a second sand-filter unit connected in series to said first sand-filter unit, said second sand-filter unit having means for receiving its influent from the effluent weir of said first sand-filter unit, said second sand-filter unit comprising a sand bed containing fine-grained sand;

a second feeding means for upflow feeding said second sand-filter unit with influent from said effluent of said first sand-filter unit; and means for re-introducing reject water from the second sand-filter unit into the influent that is fed to said first sand-filter unit.

9. The two-stage, continuously-filtered system in accordance with claim 8, further comprising means for passing reject matter from the first filter unit to waste.

10. The two-stage, continuously-filtered system in accordance with claim 8, wherein said sand bed of said first sand-filter unit comprises silica material.

11. The two-stage, continuously-filtered system in accordance with claim 8, wherein said sand bed of said second sand-filter unit comprises garnet material.

12. The two-stage, continuously-filtered system in accordance with claim 8, wherein said sand bed of said second sand-filter unit comprises silica material.

13. A two-stage, continuously filtered system for processing water in order to eliminate contaminants therefrom, comprising:

a first sand-filter unit that is upflow loaded with water influent containing contaminants, said first sand-filter unit having an effluent weir and a reject weir, with a level of said reject weir being disposed below said effluent weir;

a first feeding means for upflow feeding said first sand-filter unit with water influent containing contaminants;

a second sand-filter unit connected in series to said first sand-filter unit, said second sand-filter unit having means for receiving its influent from the effluent weir of said first sand-filter unit; and a second feeding means for upflow feeding said second sand-filter unit with influent from said effluent of said first sand-filter unit; and means for re-introducing reject water from the second sand-filter unit into the influent that is fed to said first sand-filter unit.

14. The two-stage, continuously-filtered system in accordance with claim 13, further comprising means for passing reject matter from the first filter unit to waste.

15. The two-stage, continuously-filtered system in accordance with claim 13, wherein said sand bed of said first sand-filter unit comprises silica material.

16. The two-stage, continuously-filtered system in accordance with claim 13, wherein said sand bed of said second sand-filter unit comprises garnet material.

17. The two-stage, continuously-filtered system in accordance with claim 13, further comprising:

means for feeding said first and second sand-filter units with a coagulent.

18. The two-stage, continuously-filtered system in accordance with claim 13, further comprising;

means for feeding said first sand-filter unit with chlorine as a disinfecting agent.

* * * * *